US008863257B2

(12) United States Patent
Pal

(10) Patent No.: US 8,863,257 B2
(45) Date of Patent: Oct. 14, 2014

(54) SECURELY CONNECTING VIRTUAL MACHINES IN A PUBLIC CLOUD TO CORPORATE RESOURCE

(75) Inventor: Dmitri V. Pal, Framingham, MA (US)

(73) Assignee: Red Hat, Inc., Raleigh, NC (US)

( * ) Notice: Subject to any disclaimer, the term of this patent is extended or adjusted under 35 U.S.C. 154(b) by 265 days.

(21) Appl. No.: 13/045,061

(22) Filed: Mar. 10, 2011

(65) Prior Publication Data

US 2012/0233678 A1   Sep. 13, 2012

(51) Int. Cl.
*G06F 7/04* (2006.01)
*H04L 29/06* (2006.01)
*G06F 21/44* (2013.01)
*H04L 9/32* (2006.01)

(52) U.S. Cl.
CPC .......... *H04L 9/3228* (2013.01); *H04L 63/0272* (2013.01); *H04L 63/0209* (2013.01); *G06F 21/445* (2013.01); *H04L 63/0838* (2013.01); *H04L 9/321* (2013.01)
USPC ...................... 726/7; 726/5; 713/186; 709/22

(58) Field of Classification Search
None
See application file for complete search history.

(56) References Cited

U.S. PATENT DOCUMENTS

| 7,197,550 | B2* | 3/2007 | Cheline et al. ............... 709/223 |
|---|---|---|---|
| 2005/0081045 | A1* | 4/2005 | Nicodemus et al. .......... 713/182 |
| 2006/0059344 | A1* | 3/2006 | Mononen ...................... 713/171 |
| 2007/0220253 | A1* | 9/2007 | Law ............................... 713/168 |
| 2008/0034216 | A1* | 2/2008 | Law ............................... 713/183 |
| 2008/0072303 | A1* | 3/2008 | Syed .............................. 726/10 |
| 2010/0242038 | A1* | 9/2010 | Berrange et al. .................. 718/1 |
| 2011/0078784 | A1* | 3/2011 | Ohtani ............................ 726/15 |
| 2011/0113245 | A1* | 5/2011 | Varadarajan ................... 713/168 |
| 2011/0214176 | A1* | 9/2011 | Burch et al. .................... 726/15 |
| 2012/0023325 | A1* | 1/2012 | Lai ................................ 713/155 |
| 2012/0131341 | A1* | 5/2012 | Mane et al. ................... 713/168 |
| 2012/0240204 | A1* | 9/2012 | Bhatnagar et al. ............... 726/5 |

OTHER PUBLICATIONS

Griffin, Dan "Safer Authentication with a One-Time Password Solution", pp. 1-10, © 2011 Microsoft Corp., printed from internet: http://msdn.microsoft.com/en-us/magazine/cc507652.aspx on Mar. 10, 2011.

* cited by examiner

*Primary Examiner* — Philip Chea
*Assistant Examiner* — Khoi Le
(74) *Attorney, Agent, or Firm* — Lowenstein Sandler LLP

(57) ABSTRACT

Securely connecting a virtual machine in a public cloud to corporate resources. A cloud computing system is coupled to an enterprise computing system via a network. The enterprise computing system includes a management server, an authentication server and a virtual private network (VPN) server. A cloud engine runs on the management server. The cloud engine starts an exchange with the authentication server that leads to a state in which both parties know a one-time password (OTP) and an identifier (ID) of a virtual machine (VM) hosted by the cloud computing system. The cloud engine sends the OTP and the ID to the VM. The VPN server then receives credentials from the VM. If the credentials are successfully authenticated against the OTP and the ID, a secure connection is established between the enterprise computing system and the VM.

15 Claims, 4 Drawing Sheets

SECURELY CONNECTING VIRTUAL MACHINES IN A PUBLIC CLOUD TO CORPORATE RESOURCE

TECHNICAL FIELD

Embodiments of the present invention relate to computer systems, and more specifically, to security management of a cloud computing system.

BACKGROUND

Cloud computing allows a user to obtain computing resources, such as processing cycles, applications and storage, from a cloud provider on demand. A public cloud provider provides computing resources to users and organizations over the Internet. As computing resources are provided on demand, an enterprise only needs to pay for what it uses and, therefore, reduces its expenditure on the computing infrastructure such as hardware, application and bandwidth costs. Therefore, cloud computing presents a cost effective solution for meeting the computing needs of an enterprise.

One of the resources that a public cloud can provide is a virtual machine (VM). The VM is executed under the control of an enterprise user. The VM image itself might be stored at the cloud provider. Therefore, an enterprise user has to rely on the best security practices of the cloud provider to protect the VM image. When persisted data is stored at a public cloud provider, by the nature of their business, there is a higher risk that the data could be leaked or stolen, and thus accessed by an unauthorized entity. Therefore, an enterprise typically avoids storing any kinds of passwords, keys, or certificates that would allow a VM to connect back to the enterprise resources.

When a VM connects to an enterprise, the VM may gain access to the data stored within the firewall of the enterprise computers. In a standard login procedure, an ordinary user who tries to gain access to the data within the firewall would need to type in his user ID and a password (e.g., a one-time password (OTP) since static passwords are not secure enough for remote users). In the case of automatically connecting a VM to an enterprise, there is a chicken and egg problem: for the purpose of connection, the VM needs to have an identity and know its password (e.g., an OTP or another kind of key or credential that the VM can be authenticated with). However, if the password is stored persistently within the VM, it can be stolen. With a stolen password, an intruder will be able to impersonate the VM and penetrate the enterprise security without the enterprise even knowing about the attack.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
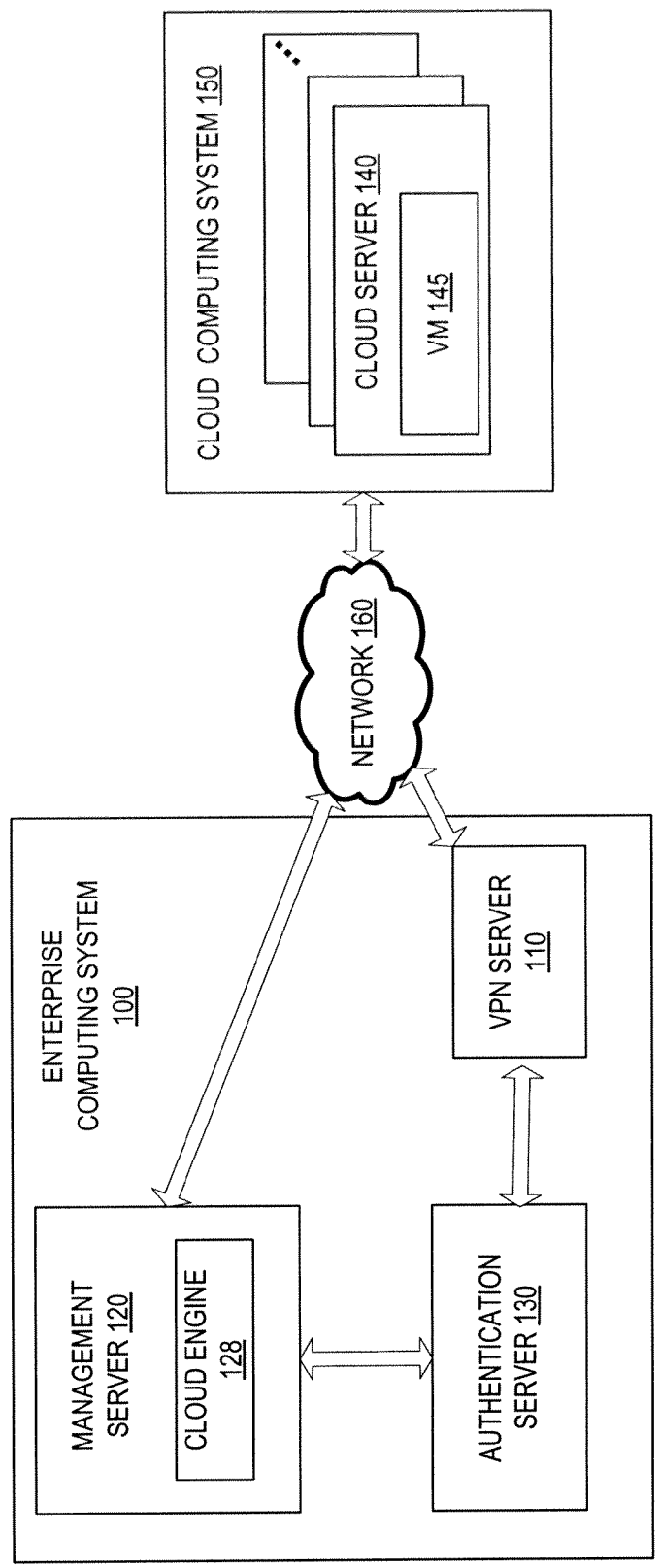
FIG. 1 is a block diagram of a network architecture in which one embodiment of the present invention may operate.

Described herein is a method and system for securely and automatically connecting a virtual machine in a public cloud to corporate resources. In one embodiment, a cloud computing system is coupled to an enterprise computing system via a network. The enterprise computing system may include a management server, an authentication server and a virtual private network (VPN) server. A cloud engine runs on the management server. The cloud engine starts an exchange with the authentication server that leads to a state in which both parties know a one-time password (OTP) and an identifier (ID) of a virtual machine (VM) hosted by the cloud computing system. The OTP can only be used once while the ID can be a one-time ID or a longer-lived ID (e.g., a one time ID may be used by a VM to establish a VPN connection once and usable while the VM is running. A longer-lived ID may span multiple launches of the same VM or may be used for different non-concurrently running VMs). The cloud engine sends the OTP and the ID to the VM through the cloud management infrastructure that controls creation, deployment and launch of the VM at the moment when the VM is requested by a user. The cloud management infrastructure provides communication channels between the VM and the enterprise environment. These channels are assumed to employ secure protocols like TLS or GSSAPI (the specific protocols are outside the scope of the description). The main characteristic of the channels are assumed to be secure and non-persistent. The channels should guarantee that the OTP is not intercepted by a man-in-the middle and they should not persist the data (which would expose the OTP to the potential attacks against data at rest). The VPN server then receives credentials from the VM. If the credentials are successfully authenticated against the authentication server using OTP and the ID, a secure connection is established between the VM and the enterprise environment. The OTP is used only to establish the secure connection and becomes invalid right after its use so that it cannot be reused to establish any other connection.

Embodiments of the present invention provide a secure and automated mechanism for connecting a VM in a public cloud to an enterprise. A VM can be treated as a trusted user if the VM submits a valid ID and a valid OTP. However, if such an OTP or seed to generate OTPs is stored inside a VM image (which is located in the public cloud), an intruder may be able to steal the image and gain access to the corporate resources. Embodiments of the present invention disclose a cloud engine, which generates (or alternatively, acquires) an OTP and a machine ID that will be accepted by an authentication server. The cloud engine then passes the OTP and the machine ID to the VM via the cloud provider interfaces. The OTP and the machine ID is used in an authentication process to establish a virtual private network (VPN) connection to the enterprise. The authentication server then automatically authenticates the VM using this OTP and the machine ID. A trusted channel is established between the VM and the corporate environment.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a network architecture in which embodiments of the present invention may operate. The network architecture includes an enterprise computing system 100 connecting to a cloud computing system 150 via a network 160. In one embodiment, the network 160 is a private network (e.g., a local area network (LAN), a WAN, intranet, etc.), a public network (e.g., the Internet), or a combination of the above networks.

In one embodiment, the enterprise computing system 100 is owned by an enterprise, a corporation, or any organization. The enterprise computing system 100 itself may have limited hardware or software computing resources, and at times relies on public cloud providers to meet its computing needs. In one embodiment, the cloud computing system 150 is operated and controlled by a public cloud provider. The public cloud provider provides computing resources to the owner of the enterprise computing system 100 as well as other organizations. Generally, the owner of the enterprise computing system 100 does not have direct control over the security of data stored in the cloud computing system 150.

In one embodiment, the enterprise computing system 100 includes a virtual private network (VPN) server 110, a management server 120 and an authentication server 130. Additional servers may also be included. The VPN server 110, the management server 120 and the authentication server 130 are coupled via a network internal to the enterprise. In one embodiment, the management server 120 includes a cloud engine 128, which manages the VMs in the public clouds for the enterprise. According to embodiments of the present invention, the cloud engine 128 controls the bootstrapping of the VMs. In response to a request to start a VM, the cloud engine 128 uses its interface with the cloud computing system 150 to request the provisioning of a VM and configures the VM (or causes the VM to be configured by a configuration server). In one embodiment, the VM is configured to receive an OTP and a machine ID from the cloud engine 128 and to submit the OTP and the machine ID for authentication.

In one embodiment, the VPN server 110, the management server 120 and the authentication server 130 are three separate server computers. Among the three servers, the VPN or 110 is coupled to the authentication server 130, and the authentication server 130 is coupled to the management server 120. In an alternative embodiment each of the three servers may include multiple server computers. Examples of the server computers include mainframes, workstations, personal computers (PCs), or other computing devices. The cloud engine 128 runs on the management server 120 and is executed by the processors of the one or more server computers of the management se 120. Although FIG. 1 shows one VPN server, one management server and one authentication server in the enterprise computing system 100, it is understood that the enterprise computing system 100 may include any number of VPN servers, management servers and authentication servers.

In one embodiment, the enterprise computing system 100 uses the VPN server 110 to set up a firewall to the external environment. To access the resources within the enterprise computing system 100, an external entity needs to connect to the VPN server 110, submit its credentials, and then be authenticated by the authentication server 130. The external entity may be a user, such as an employee of the enterprise who tries to access his files from an off-site location. In one embodiment, the external entity is a VM 145, and the credentials contain an ID of the VM 145 and a password. In one embodiment, the password is an OTP, which is generated and passed to the VM 145 by the enterprise computing system 100. The OTP can be used only once by the VM 145. The VM 145 uses the OTP once to establish a VPN connection and then the OTP is no longer valid. Embodiments of the invention may use time-based algorithms or sequence-based algorithms to generate the OTP such that the OTP is short-lived. These algorithms may be provided by third parties as off-the-shelf software modules. Thus, one condition for this OTP to work is that the connection to the enterprise environment is a part of the system initialization (e.g., VM initialization/startup) rather than a delayed operation.

In cryptography, OTPs are designed to counter "replay" attacks, in which a malicious party uses a stolen password to gain access to a protected system. As an OTP can be used only once, a malicious party who steals an OTP will not be able to re-use the same OTP to gain access. Therefore, OTPs are sec e in comparison with static passwords.

In one embodiment, the cloud computing system 150 includes a number of cloud servers 140, which may be operated by a third party (e.g., a public cloud provider). In one embodiment, one or more of the cloud servers 140 host VMs, which can be started on demand upon requests of enterprise users. The cloud servers 140 may span over multiple geographic locations. Each of the cloud servers 140 may be a mainframe, a workstation, a personal computer (PC), or other computing devices.

In one embodiment, each cloud server 140 runs one or more VMs. The VMs may run the same or different guest operating systems, such as Microsoft Windows®, Linux®, Solaris®, Mac® OS, etc. In one embodiment, each cloud server 140 also runs a hypervisor to virtualize access to the underlying host hardware, making the use of the VMs transparent to the enterprise users. The hypervisor may also be known as a virtual machine monitor (VMM) or a kernel-based hypervisor. In some embodiments, the hypervisor is part of the host OS.

Figure 2:
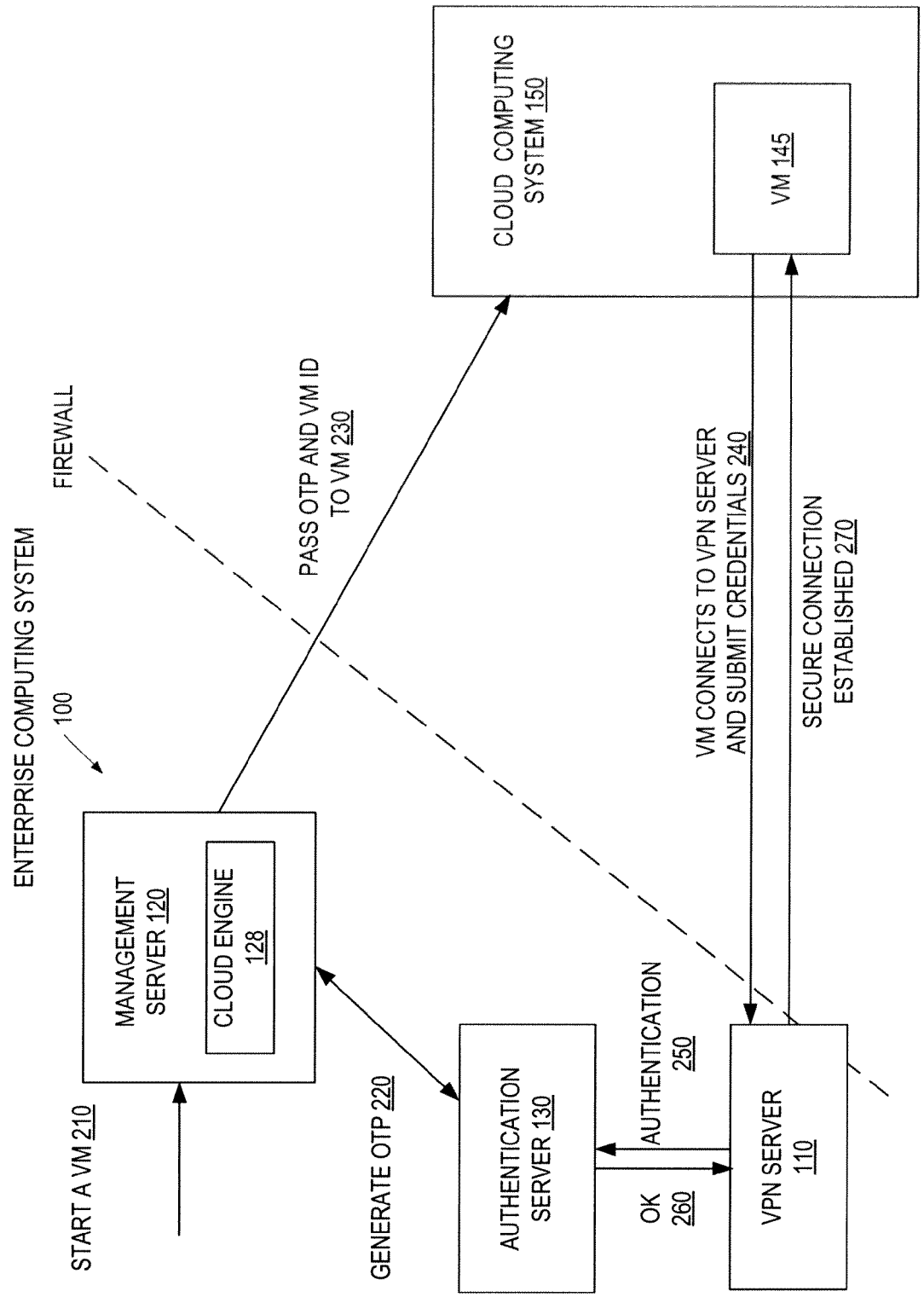
FIG. 2 is a diagram illustrating one embodiment of an operation sequence performed by an enterprise computing system and a cloud computing system

FIG. 2 is a diagram that illustrates an operation sequence performed by the servers of FIG. 1. In one embodiment, the cloud engine 128 receives a request to start a VM (e.g., the VM 145) in the cloud computing system 150 (arrow 210). The VM 145 may be located in any of the cloud servers 140 in any geographic location. In one embodiment, the location of the VM 145 is determined by the cloud provider based on load, cost, and/or other factors.

In one embodiment, the request to start a VM can be from an enterprise user, a system administrator, an automated program, etc. In response, the enterprise computing system 100 automatically generates an OTP and an associated VM ID. In one embodiment, the cloud engine 128 generates an OTP and seeds the OTP in the authentication server 130 (arrow 220). The term "seeding an OTP" herein refers to creating an entry (e.g., an account) containing the OTP and an associated VM ID. The VM ID may be a randomly generated number. In an alternative embodiment, the authentication server 130 generates the OTP and the VM ID, and the cloud engine 128 acquires the generated data from the authentication server 130 (arrow 220). In yet another embodiment, the authentication server 130 generates the OTP and the cloud engine 128 generates the VM ID. The authentication server 130 and the cloud engine 128 then exchange the generated data to associate the VM ID with the OTP (arrow 220). The exchange may involve the transmission of a sequence of messages. It is understood that other variations to the above embodiments may exist, where any sequence of the messages between the cloud engine 128 and the authentication server 130 leads to the state in which both OTP and ID are known ("shared") by the cloud engine 128 and the authentication server 130.

Subsequently, the cloud engine 128 passes the OTP and the VM ID to the VM 145 (arrow 230). The VM 145 then connects to the VPN server 110, and submits its credentials (which contain the OTP and the VM ID) to the VPN server 110 (arrow 240). The VPN server 110 forwards the credentials to the authentication server 130 (arrow 250). The authentication server 130 authenticates the credentials against the OTP and the VM ID that were previously generated and stored in the authentication server 130. The authentication server 130 then indicates the result of the authentication to the VPN server 110 (arrow 260). If the authentication is successful, the VM 145 will be treated as a trusted entity. As a result, a secure connection will be established between the VM 145 and the enterprise computing system 100 to allow the VM 145 to access the enterprise computing resources (arrow 270).

Figure 3:
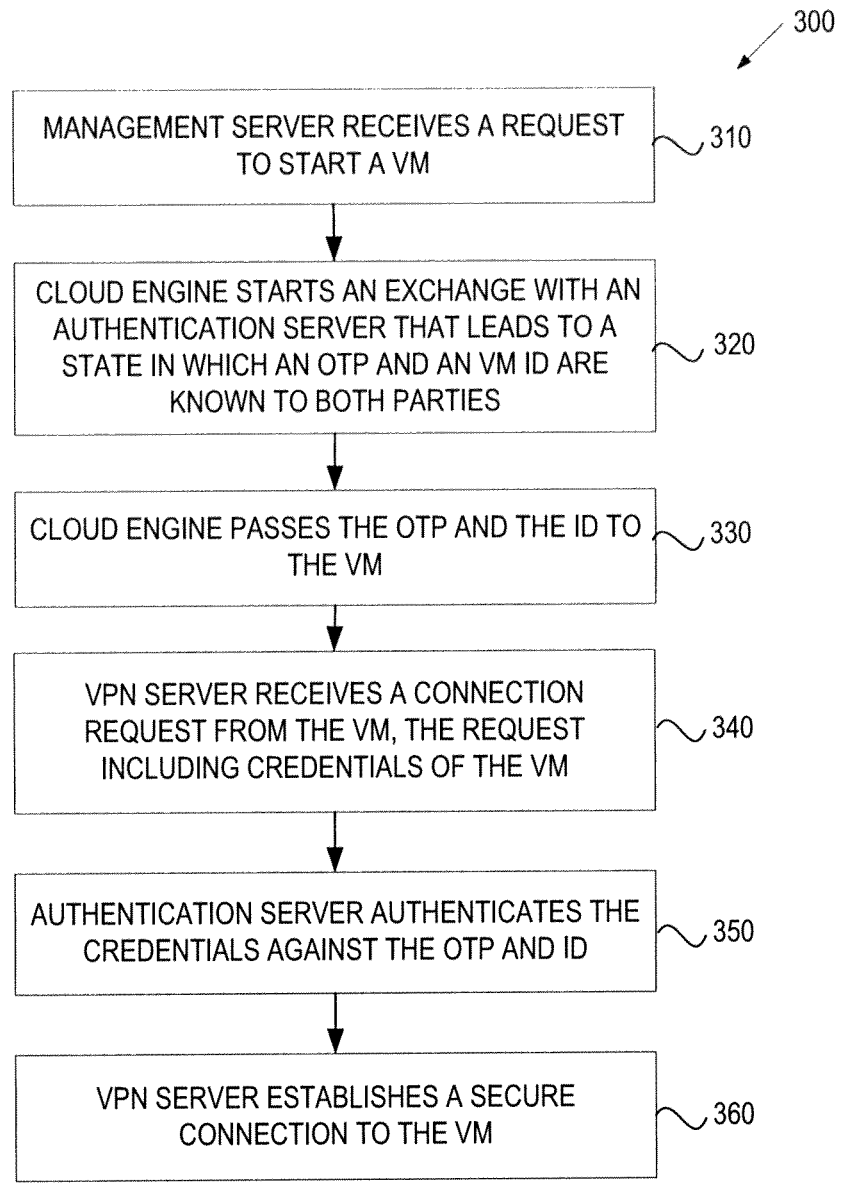
FIG. 3 is a flow diagram illustrating one embodiment of a method for connecting a virtual machine in a public cloud to an enterprise.

FIG. 3 is a flow diagram illustrating one embodiment of a method 300 for securely connecting a virtual machine in a public cloud to an enterprise. The method 300 may be performed by a computer system 400 of FIG. 4 that may comprise hardware (e.g., circuitry, dedicated logic, programmable logic, microcode, etc.), software (e.g., instructions run on a processing device), or a combination thereof. In one embodiment, the method 300 is performed by the enterprise computing system 100 of FIG. 1 and FIG. 2.

Referring to FIG. 3, in one embodiment, the method 300 begins when the management server 120 receives a request to start a VM (block 310). The cloud engine 128 starts an exchange with the authentication server (block 320) that leads to the state in which both an OTP and a VM ID is known to both parties. In an alternative embodiment, such exchange is done in advance and both sides have all necessary information to synthesize an OTP at any given moment without actual direct communication when the request (block 310) to start a VM is initiated (block 320). The cloud engine 128 then passes the OTP and the VM ID to a VM provisioned to the enterprise by the cloud provider (block 330). Subsequently, the VM connects to the VPN server 110 of the enterprise computing system 100. The VPN server 110 receives the credentials of the VM (block 340). The authentication server 130 of the enterprise computing system 100 authenticates the credentials against the previously-generated OTP and VM ID (block 350). If the authentication is successful, a secure connection is established and the VM is granted access to the resources of the enterprise computing system 100 using the secure connection (block 360). If the authentication is unsuccessful, the VM will be denied access to the enterprise computing system 100.

A number of embodiments exist for the enterprise computing system 100 to generate the OTP at block 320. In one embodiment, the cloud engine 128 receives a software token from the authentication server 130 in advance. The authentication server 130 may be a $3^{rd}$ party authentication server or a variation thereof, a proxy to a $3^{rd}$ party authentication server or a variation thereof, or has an embedded $3^{rd}$ party authentication server or a variation thereof. A software token generally includes two components: 1) a software application that implements an OTP-generating function, and 2) a seed record used by the application to generate the OTP. The authentication server 130 has a copy of the software token that it can use to generate an OTP. The cloud engine 128 also uses the software token received from the authentication server 130 to generate the OTP. The cloud engine 128 then passes the OTP to the VM.

In an alternative embodiment, the OTP can be generated with a shared secret approach. The authentication server 130 and the cloud engine 128 share a seed that is provisioned at some point in time when the enterprise computing system 100 is set up. For example, the OTP can be generated using the following algorithm:

$$\text{OTP}=\text{base64}(\text{HMAC}(\text{SHA256}(\text{SEED}\|\text{NONCE}))\|\text{NONCE}),\quad \text{[Equation 1]},$$

where "∥" is concatenation, HMAC is the abbreviation for Hashed Message Authentication Code, "SEED" is 32 bytes of random data shared between the cloud engine 128 and the authentication server 130, and "NONCE" is a random byte sequence of at least 16 bytes. The NONCE can be either a random number or a number generated from a time stamp (or a count sequence) and the cloud engine's ID. Either the cloud engine 128 or the authentication server 130 can generate the NONCE. The entity (the cloud engine 128 or the authentication server 130) capable of generating random numbers with high entropy and good cryptographic randomness can be used to generate the NONCE. Between the two entities (the cloud engine 128 and the authentication server 130), the same entity that generates the NONCE may also generate the OTP. The resulting OTP is then passed to the other entity. Alternatively, one entity (e.g., the authentication server 130) may generate the NONCE and the other entity (e.g., the cloud engine 128) may generate the OTP based on the NONCE and the shared SEED. It is understood that other algorithms that are different from the above examples can also be used to generate an OTP as a derived hash of shared SEED and NONCE.

In an embodiment where the enterprise computing system 100 includes multiple authentication servers 130, the OTPs and VM IDs need to be replicated among the multiple authentication servers 130. In some scenarios, delays caused by the replication can cause authentication failure. For example, if a first authentication server is seeded with an OTP but an authentication request is sent to a second authentication server before the second authentication server receives the replicated OTP, the authentication will fail. The shared secret approach does not require replication since the NONCE is passed around as part of the OTP. To further explain why there is no replication problem, in Equation 1 above, the NONCE is appended to the resulting hash that constitutes the resulting OTP. Therefore, anyone (including the receiving authentication server 130) looking at the OTP can get NONCE in the clear. Thus, the authentication server 130 can get a shared SEED from its storage, extract the nonce from OTP, calculate the hash that constitutes the first part of the OTP and compare them to obtain the NONCE. There is no need to have a conversation between the cloud engine 128 and the authentication server 130 right before the authentication.

When the authentication server 130 and the cloud engine 128 cannot generate the OTP independently and have to share information (the OTP itself) right before the authentication occurs, there is a race condition related to the replication explained above.

In an alternative embodiment, the cloud engine 128 creates an account and sets up an OTP upon request for a VM. However, as described above, replication delay can cause authentication failure if the authentication is performed by an authentication server that has not received the replicated OTP.

In yet another alternative embodiment, the cloud engine 128 pre-creates an account seeded with an OTP (or a number of accounts each seeded with an OTP). Upon request to start a VM, the cloud engine 128 enables the account and passes its OTP to the VM. In this embodiment, there are two replications: one at account creation time and the other at account enabling time. However, at the account enabling time, the amount of replicated data that needs to be passed around is less than the above embodiment in which the account is created after receiving a request for a VM.

In yet another alternative embodiment, the authentication server 130 can run a sequence-based OTP algorithm (e.g., HOTP) and the cloud engine 128 asks the authentication server 130 for the resulting OTP. To provide the OTP to the cloud engine 128, the authentication server 130 exposes a "getcode" interface to the cloud engine. However, the interface may present a security problem if an untrusted entity is able to gain access to the interface.

Figure 4:
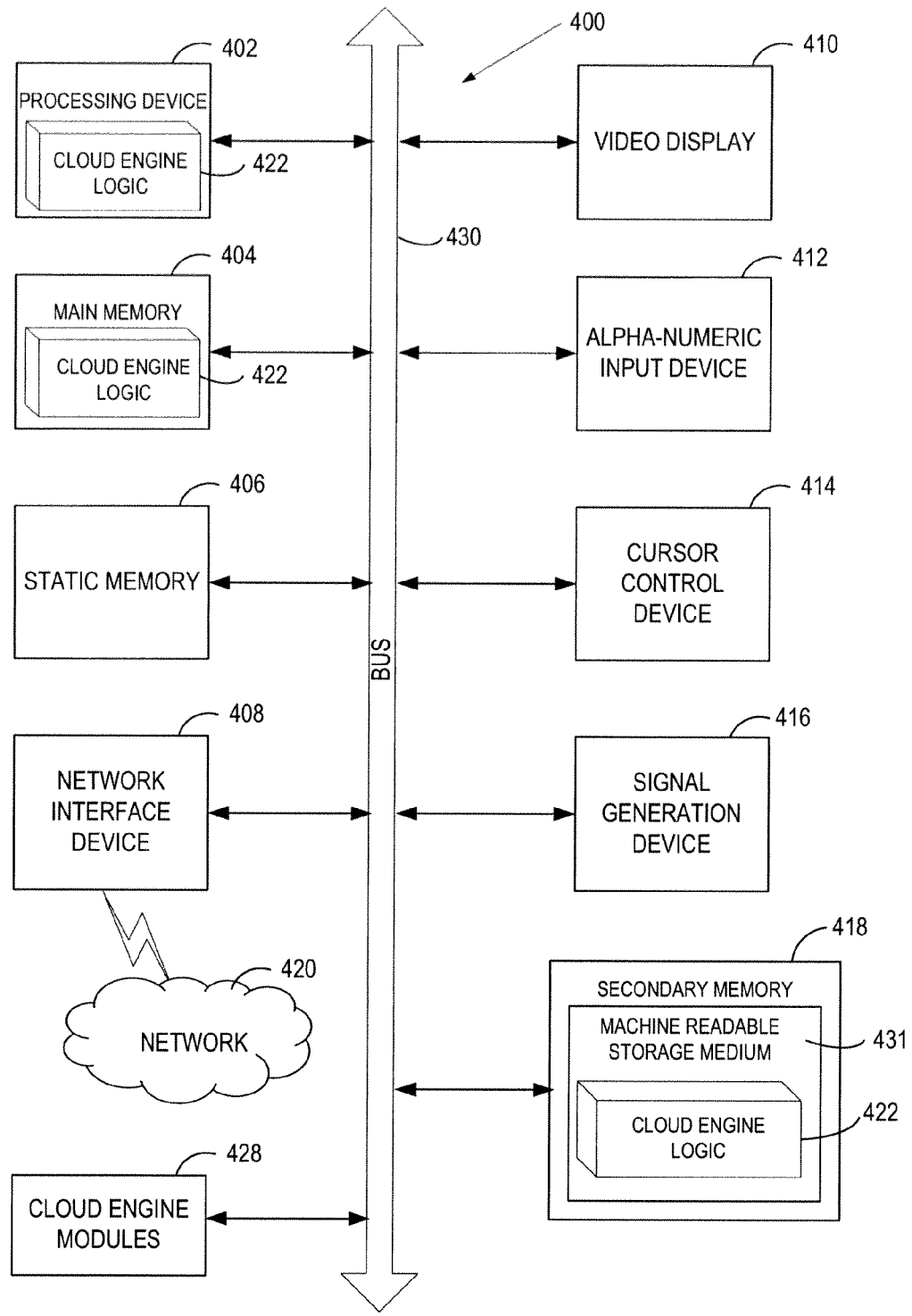
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute enterprise computing logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., enterprise computing logic 422) embodying any one or more of the methodologies or functions described herein (e.g., the cloud engine 128, the authentication server 130 and/or the VPN server 110 of FIG. 1 and FIG. 2). The enterprise computing logic 422 may also reside, completely or at least partially, within the main memory 404 and/or within the processing device 402 during execution thereof by the computer system 400; the main memory 404 and the processing device 402 also constituting machine-readable storage media. The enterprise computing logic 422 may further be transmitted or received over a network 420 via the network interface device 408.

The machine-readable storage medium 431 may also be used to store the enterprise logic computing 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 400 may additionally include enterprise computing modules 428 for implementing the functionalities of the cloud engine 128, the authentication server 130 and/or the VPN serve 110 of FIG. 1 and FIG. 2. The module 428, components and other features described herein (for example in relation to FIG. 1 and FIG. 2) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "starting", "establishing", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    generating a one-time password (OTP) by one of a cloud engine of a private enterprise computing system or an authentication server, wherein the cloud engine is executable by a processing device;
    passing the OTP to the other one of the cloud engine and the authentication server;
    starting, by the cloud engine, an exchange with the authentication server to lead to a state in which both the cloud engine and the authentication server comprise an identifier (ID) of a virtual machine (VM), the VM hosted by a public cloud computing system coupled to the private enterprise computing system via a network;
    sending, by the private enterprise computing system, the OTP and the ID to the VM;
    creating an account at an account creation time before starting the VM;
    associating the OTP and the ID for the VM with the account;
    enabling the account at an account enablement time that is after the account creation time;
    receiving credentials of the VM and a request to access a virtual private network (VPN) server of the private enterprise computing system;
    authenticating the credentials of the VM against the OTP and the ID; and
    establishing, by the private enterprise computing system, a secure connection between the VPN server and the VM when the credentials received from the VM comprise the OTP and the ID.

2. The method of claim 1, further comprising:
    generating the OTP by each of the cloud engine and the authentication server in view of information shared between the cloud engine and the authentication server.

3. The method of claim 1, further comprising:
    generating the OTP using a software token or a seed shared between the cloud engine and the authentication server.

4. The method of claim 1, wherein
    the account is created before receiving a request to start the VM, and wherein the account is enabled upon receiving the request to start the VM.

5. The method of claim 1, wherein receiving credentials from the VM further comprises:
    receiving, by a virtual private network (VPN) server, the credentials from the VM; and
    sending, by the VPN server, the credentials to the authentication server for authentication.

6. A system comprising:
    a management server, which comprises a processing device that executes a cloud engine, the cloud engine to send a one-time password (OTP) and an identifier (ID) to a virtual machine (VM), the VM hosted by a public cloud computing system coupled to the management server via a network, wherein the cloud engine to start an exchange with an authentication server to lead to a state in which both the cloud engine and the authentication server comprise the OTP and the ID, wherein the OTP is generated by one of the cloud engine and the authentication server, and passed to the other one of the cloud engine and the authentication server, wherein the authentication server is to:
    create an account at an account creation time,
    associate the OTP and the ID for the VM with the account, and
    enable the account at an account enablement time that is after the account creation time;
    a virtual private network (VPN) server to receive credentials from the VM and a request to access the VPN server; and
    the authentication server coupled to the management server and the VPN server to establish a secure connection between the VM and the VPN server upon authenticating the credentials against the OTP and the ID.

7. The system of claim 6, wherein the OTP is generated by each of the cloud engine and the authentication server in view of information shared between the cloud engine and the authentication server.

8. The system of claim 6, wherein the OTP is generated in view of a software token or a seed shared between the cloud engine and the authentication server.

9. The system of claim 6, wherein the authentication server is to store the account for the VM.

10. The system of claim 9, wherein the account is created before a request is received to start the VM, and is enabled upon receipt of the request to start the VM.

11. A non-transitory computer readable storage medium comprising instructions that, when executed by a processing device, cause the processing device to perform operations comprising:
    generating a one-time password (OTP) by one of a cloud engine or an authentication server, wherein the cloud engine is executable by the processing device;
    passing the OTP to the other one of the cloud engine and the authentication server;
    starting, by the cloud engine of a private enterprise computing system, an exchange with the authentication server to lead to a state in which both the cloud engine and the authentication server comprise an identifier (ID) of a virtual machine (VM), the VM hosted by a public cloud computing system coupled to the private enterprise computing system via a network;

sending, by the private enterprise computing system, the OTP and the ID to the VM;

creating an account at an account creation time before starting the VM;

ssociating the OTP and the ID for the VM with the account;

enabling the account at an account enablement time that is after the account creation time;

receiving credentials of the VM and a request to access a virtual private network (VPN) server of the private enterprise computing system;

authenticating the credentials of the VM against the OTP and the ID; and establishing, by the private enterprise computing system, a secure connection between the VPN server and the VM upon authenticating credentials submitted by the VM against the OTP and the ID.

12. The computer readable storage medium of claim 11, further comprising:

generating the OTP by each of the cloud engine and the authentication server in view of information shared between the cloud engine and the authentication server.

13. The computer readable storage medium of claim 11, further comprising:

generating the OTP using a software token or a seed shared between the cloud engine and the authentication server.

14. The computer readable storage medium of claim 11, wherein the account is created before receiving a request to start the VM, and wherein the account is enabled upon receiving the request to start the VM.

15. The computer readable storage medium of claim 11, wherein receiving credentials from the VM further comprises:

receiving, by a virtual private network (VPN) server, the credentials from the VM; and sending, by the VPN server, the credentials to the authentication server for authentication.

* * * * *